Figure 1:
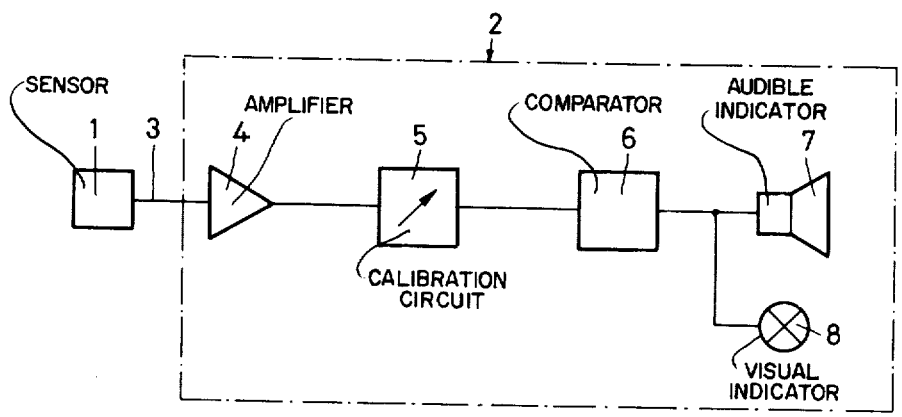

United States Patent [19]
Schick

[11] 3,919,688
[45] Nov. 11, 1975

[54] MAXIMUM-SPEED SIGNALLING DEVICE FOR MOTOR VEHICLES

[75] Inventor: Georges Schick, Renens, Switzerland

[73] Assignee: Schick & Cie, Renens, Switzerland

[22] Filed: Mar. 13, 1974

[21] Appl. No.: 450,678

[30] Foreign Application Priority Data
Mar. 21, 1973 Switzerland.................. 4113/73
Mar. 4, 1974 Switzerland.................. 3011/74

[52] U.S. Cl. ................ 340/62; 340/263; 180/106; 180/110
[51] Int. Cl.² .......................................... B60Q 1/54
[58] Field of Search .... 340/62, 263; 180/98, 105 R, 180/105 E, 106, 110

[56] References Cited
UNITED STATES PATENTS
3,656,099  4/1972  Campbell .................. 340/62

*Primary Examiner*—Alvin N. Waring
*Attorney, Agent, or Firm*—Stevens, Davis, Miller & Mosher

[57] ABSTRACT

An accessory maximum speed signalling device which is used with a motor vehicle having a first housing and a speedometer including a rotatable magnet in the first housing, the magnet producing a rotating magnetic field having field lines which extend outside the first housing. The accessory device includes a sensor adapted to be located within the field lines which extend outside the first housing but without the first housing, the sensor being sensitive to variations in the magnetic field lines which extend outside the first housing and emitting an electric signal representative of the variations. A second housing, connected to the sensor, includes a speed alarm, a control circuit for receiving the signal emitted by the sensor and actuating the alarm when the signal reaches a predetermined threshold, and a setting device for adjusting the threshold.

10 Claims, 4 Drawing Figures

MAXIMUM-SPEED SIGNALLING DEVICE FOR MOTOR VEHICLES

The present invention relates to a maximum-speed signalling device for motor vehicles, utilizing the rotating magnetic field produced by a magnet forming part of the speedometer of the vehicle.

It has already been suggested to equip motor vehicles, particularly cars or trucks, with an audible or visible signal warning the driver when the vehicle reaches or exceeds a certain maximum speed, e.g., 60 km/hr. (40 mph). Some of these known devices utilize the rotating magnetic field produced by the permanent magnet of the speedometer. As is well known speedometers comprise a flexible cable driven in rotation from the transmission system of the vehicle, a shaft attached to the end of this cable, a permanent magnet integral with the shaft, and a speed cup made of non-magnetic metal which covers the permanent magnet. This speed cup is mounted on a rotary shaft coaxial to that of the magnet, integral with the speedometer needle, and subjected to the action of a coil spring. The eddy currents induced in the speed cup by the rotation of the magnet impart to the speed cup a torque proportionate to the speed of rotation of the magnet, so that the deviation of the needle is in turn proportionate to the speed of rotation of the flexible cable. Inasmuch as the ratio of the speed of rotation of the wheels of the vehicle to that of the flexible cable varies from one type of vehicle to another, the characteristics of the speedometer must take that factor into account.

In order to utilize the magnetic field of the rotating magnet, it has been proposed to surround the speed cup with a ring of ferromagnetic material acting as a flux conductor and to couple to this ring an induction coil mounted on a lateral projection of the ring. The signal emitted by the coil serves to actuate an indicator.

In other cases, it has been proposed to add to the speedometer a generator with a stator comprising an induction coil in which a permanent magnet is engaged and to equip the shaft which carries the permanent magnet of the speedometer with a disc of ferromagnetic material provided with projections along its periphery. Because the stator of the generator is disposed immediately opposite the path travelled by the projections of the flux conductor, when these projections pass in front of the end of the magnet, variations of magnetic flux are produced which generate in the induction coil an alternating current, the frequency of which is a multiple of that of the variations of the magnetic field of the magnet driving the speed cup.

These known devices are so designed as to be able to produce the electric energy which actuates an indicator or even a control device, this energy being supplied by the driving means of the speedometer cable. Because of the way in which they are designed, they require a special construction of the speedometer inasmuch as its housing must allow sufficient space for the flux conductor and, as the case may be, for the induction coil.

This requirement for a special construction obviously prevents devices of this type from being installed on vehicles already in service, unless their speedometer is replaced or, at the very least, modified, which involves taking it apart and incurring the risk of faulty operation later on. What is more, the installation of such devices on existing vehicles would necessitate a calibration of the indicator in order for it to function at the desired maximum speed, taking into account the ratio between the speed of the cable and that of the wheels.

It is the object of the present invention to provide a signalling device which constitutes a completely independent unit and which can easily be placed on any existing vehicle at all without requiring any disassembly or modification of the speedometer or any complicated calibration work.

According to the present invention, this object can be achieved by a maximum-speed signalling device for motor vehicles, utilizing the rotating magnetic field produced by a magnet forming part of the speedometer of the vehicle, further comprising a freely-locatable sensor provided with means for affixing it to a surface, sensitive to variations of the magnetic field outside of the speedometer, emitting an electric signal representative of the variations, and a housing electrically connected to the sensor and comprising an indicator, a control circuit receiving the signal emitted by the sensor and actuating the indicator when this signal reaches a predetermined threshold, and setting means enabling the adjustment of the threshold at will.

The device thus defined constitutes a unit independent of the vehicle. Its housing may be attached anywhere, so that the setting means are accessible from the driver's seat, and its sensor is small enough to be affixed to any surface near the speedometer. The housing is supplied with current either from a dry-cell battery inside the housing or by a connection to the battery of the vehicle. The sensor, influenced by the leakage flux from the rotary magnet of the speedometer, causes the signalling of the chosen maximum speed, which can be adjusted via the setting means.

Figure 2:
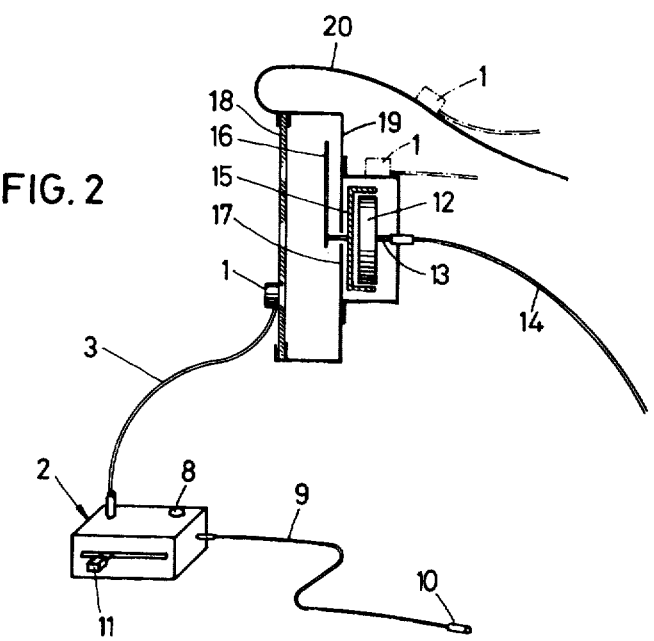
Figure 3:
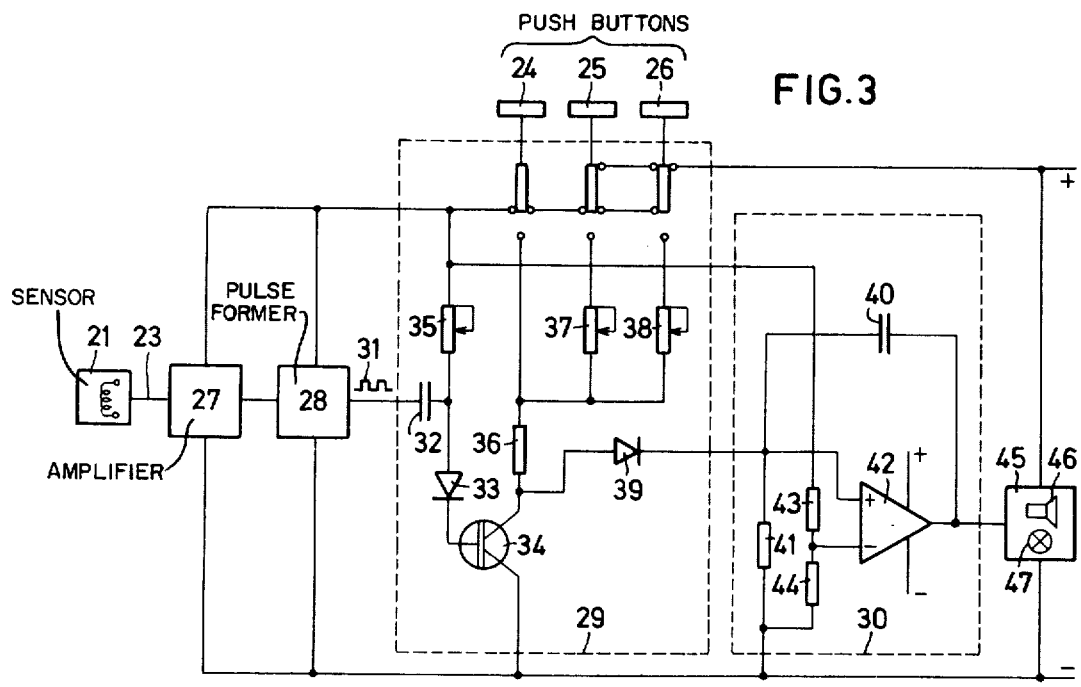
Figure 4:
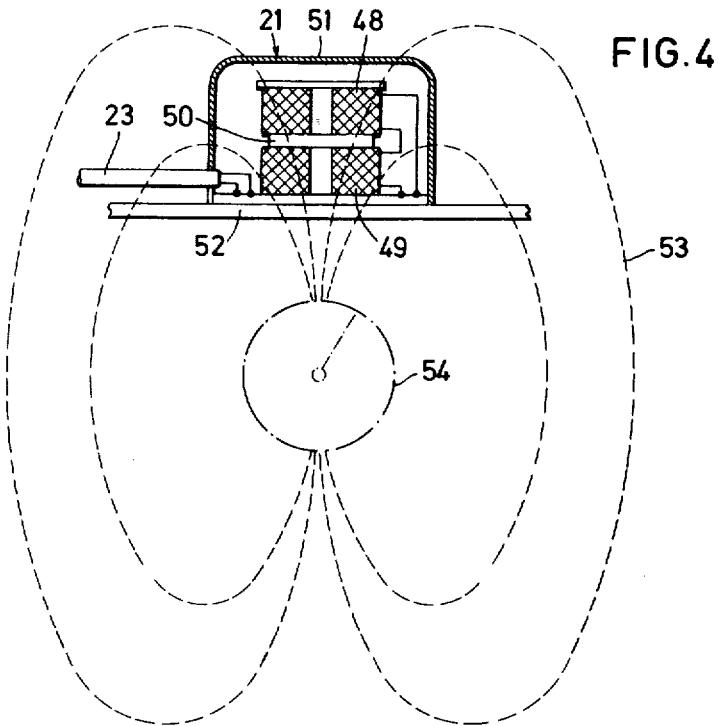

Two possible embodiments of the invention will now be described in detail, by way of example, with reference to the accompanying drawing, in which FIG. 1 represents a block diagram of the signalling device, FIG. 2 shows a diagrammatic view of a motor vehicle speedometer and of the signalling device, FIG. 3 is an electrical diagram of the second embodiment of the device, and FIG. 4 is a sectional view of the sensor of this second embodiment, also showing diagrammatically the magnetic field of the speedometer magnet.

The apparatus shown diagrammatically in FIG. 1 is composed of a freely-locatable magnetic sensor 1 and an indicator housing 2, these two parts being connected by a flexible cable 3. A freely-locatable sensor is understood to mean a part which can easily be placed at any location and relocated as desired. The indicator housing 2 comprises an amplifier 4, a calibration circuit 5, a comparator circuit 6, an audible indicator 7, and a visual indicator 8, these various circuits being connected to one another and to the input of the cable 3.

In the example of an embodiment described here, the magnetic sensor 1 is an air-core induction coil. This coil may comprise, for example, 3,000 turns of wire 0.07 mm in diameter. It is housed in a cylindrical shell, the end face of which is coated with an adhesive making it possible to affix it detachably to any smooth surface.

The circuits 4, 5 and 6 are electronic circuits of conventional design which need not be described in detail. They may be integrated circuits or hybrid circuits, for instance. These circuits are supplied with electrical energy by means of a connection 9 (FIG. 2) and a plug 10 which may, for example, be plugged into the car's cigarette lighter. The housing could also contain a battery supplying the circuits independently. In the circuit 4, the signal picked up by the coil 1 is amplified and shaped. The circuit 5 produces a reference signal which is adjustable and which may be controlled by a setting lever 11 projecting from the wall of the housing 2, as seen in FIG. 2. This signal can be produced by an adjustable calibration oscillator, constituting a reference element. In the circuit 6, the reference signal emanating from the circuit 5 and the signal emanating from the amplifier 4 will feed a comparator which produces an output signal when the frequency of the signal from the circuit 4 reaches or exceeds a threshold determined by the adjustment of the circuit 5. The buzzer 7 and the lamp 8 are then actuated. The functions to be performed by the circuits 4, 5 and 6 may be achieved by means of various electronic connections. A more detailed example will be given later with respect to the second embodiment. The arrangement may be such that the buzzer 7 is actuated for a given period of time when the frequency of the signal received reaches that determined by the setting means, whereas the lamp 8 does not light up unless the frequency of the signal received exceeds that of the reference signal. It may also be provided that the light signal does not start to operate until the divergence between the received frequency and that which corresponds to the reference signal exceeds a certain positive value. The light signal could be a flashing signal formed of electroluminescent diodes.

In another embodiment of the apparatus described, the circuits are designed to perform the following functions: the voltage pulses supplied by the coil 1 are first amplified and shaped, then integrated in a capacitor having a charge variable in accordance with the speed. The voltage at the terminals of the capacitor will therefore be a measure of the speed, and the indicator will be controlled by a relay or a trigger having an adjustable threshold of operation which will determine the speed at which the indicator will go into action.

In lieu of the coil 1, it would also be possible to provide other components sensitive to a variation of a magnetic field, such as magnetic semiconductor elements, for example.

The apparatus described constitutes a detector and indicator device which can signal the moment when the car equipped with it reaches and exceeds a given speed if this car has a magnetic-drive speedometer like those with which most cars nowadays are equipped.

FIG. 2 shows a magnetic speedometer with a housing 19 in which there is mounted a cross-magnetized permanent magnet 12 suspended on a shaft 13 and connected to a flexible shaft 14 which is in turn connected to the engine, so that the speed of rotation of the magnet 12 is proportionate to the speed of the vehicle. In front of the magnet 12 is mounted a non-magnetic armature 15 made, for example, of copper or aluminum, coaxial with the magnet 12, restrained by a coil spring (not shown), and integral with a speedometer needle or speed indicating means 16 which moves between a dial 17 and a glass 18 on actuation by the armature. Because of the eddy currents induced in the armature 15 by the magnetic field variations due to the rotation of the magnet 12, the armature 15 is subjected to a torque which is proportionate to the speed of rotation of the magnet 12, so that its angular position stabilizes at a value which corresponds to the speed.

It follows from the foregoing that a sufficiently sensitive sensor 1 can be provided in the form of a freely-locatable part having a volume on the order of about 1 cc. It need only be placed anywhere in the vicinity of the magnet 12 in order for the variations of the leakage flux picked up by the coil of the sensor 1 to be sufficient to cause voltage variations at the input of the amplifier 4, the frequency of these variations being proportionate to the speed of the vehicle. The sensor 1 can be affixed to the glass 18 of the speedometer or, if it is not desired to have it visible, to a wall of the housing 19, or even to the dashboard 20. FIG. 2 shows various possible locations for the sensor 1. The housing 2 of the indicating apparatus will be attached to the dashboard so that the light signal 8 will be visible and the setting lever 11 will be easily accessible.

FIGS. 3 and 4 are explanatory diagrams relating to a second embodiment of the device according to the invention.

In this second embodiment, there is again a freely-locatable sensor 21 connected to the housing of the apparatus by a conductor 23. The housing itself contains various circuits supplied by a d.c. voltage source. This source may be the battery of the motor vehicle on which the apparatus is installed. The supply passes through three contact push-buttons 24, 25, 26. When the two buttons 25 and 26 are pushed in, circuits 27, 28, 29 and 30 are not supplied, so that the apparatus is inoperative. If, on the other hand, only one of the three buttons 24, 25, 26 is pushed in, all the circuits are supplied. The circuit 27 is an amplifier circuit, and the circuit 28 is a pulse-former for shaping the pulses from the sensor 21. They are conventionally arranged. The circuit 28 may, for example, comprise a Schmitt trigger. As in the first embodiment, the frequency of the input pulses corresponds to the speed of rotation of the tachometer magnet of the vehicle when the sensor 21 is attached in the immediate vicinity of that apparatus. This frequency therefore represents a measure of the speed. The shape of the pulses emanating from the circuit 28 is indicated by the reference numeral 31.

The trailing edge of the rectangular signal 31 blocks a transistor 34 when it arrives at its base via a capacitor 32 and a diode 33. The duration of signal the appearing at the collector of the transistor 34 is a function of the characteristics of the capacitor 32 and of a potentiometer 35 which can be adjusted at will, e.g., by means of a rotary button mounted on a face of the housing. This potentiometer makes it possible to vary the duration of the signal, e.g., in a ratio of 7:1. It constitutes a reference element. The signal emitted by the transistor 34 is weighted by the resistances assigned to the circuits of the three push-buttons 24, 25 and 26. It will be seen that the push-button 24 is connected to a resistor 36 directly, while each of the push-buttons 25 and 26 is connected to this resistor via potentiometers 37 and 38 respectively, these two potentiometers likewise being adjustable at will and constituting other reference elements. The weighting of the signal will therefore vary according to whether one or the other of the buttons 24, 25 or 26 is pushed in. The signal thus weighted is supplied by a diode 39 to the comparator circuit 30. In this circuit, a capacitor 40 integrates the signal received while simultaneously discharging across a resistor 41. When the positive input of an amplifier 42, which acts as a comparator, reaches the reference level fixed at its negative input by a resistance bridge 43, 44, the comparator flips and the polarity of the voltage applied to the capacitor 40 reverses until the positive input of the comparator again reaches the level of the negative input, which causes the comparator to flip back into its initial state, so that the capacitor 40 starts to charge again. It will be noted that the reference level determined by the bridge 43, 44 is the same as that used in the amplifier circuit 27. The comparator circuit 30 does not start to furnish signals to its output unless the frequency of the signal 31 is sufficient to cause the capacitor 40 to charge. This frequency threshold is determined by the adjustment of the potentiometer 35, on the one hand, and by the position of the push-buttons 24, 25, and 26 on the other hand, and in the event that one or the other of the buttons 25 or 26 is pushed in, by the adjustment of the corresponding potentiometer 37 or 38. The output signal of the comparator 30 consists of pips which follow at the rate of about one per second when the capacitor 40 begins to charge and to discharge. This rate increases as the frequency of the signal 31 itself increases. The frequency of the pips is essentially determined by the characteristics of the capacitor 40 and of the resistor 41. Thus the fact that the tachometers mounted on ordinary motor vehicles of the different types known may have different characteristics, and that the range of frequencies picked up by the sensor 21 may vary within quite wide limits, has practically no effect upon the duration and the frequency range of the pips delivered by the comparator 30.

Finally, the output of the comparator circuit 30 is connected to an indicator circuit 45 which comprises, as in the first embodiment, a loudspeaker 46 and a lamp 47. The supply voltage of the oscillator incorporated in the circuit 45 can likewise be adjusted by a potentiometer (not shown), which makes it possible to vary the sound volume of the audible indicator, the oscillating frequency of which will be about 2 kc/s, for instance.

Hence the apparatus described may be adjusted by the user in such a way that its reference circuits store three different frequency thresholds adjusted by the potentiometers 35, 37, and 38, respectively, each of these frequencies corresponding to a maximum speed of the vehicle, e.g., 60 km/hr, 80 km/hr, and 100 km/hr (or 40 mph, 50 mph and 60 mph). Depending upon which one of the buttons 24, 25 or 26 is pushed in, the indicator will go into operation when the corresponding maximum speed is reached.

The advantage of the arrangement described above is that it is very simple and reliable, that it lends itself to mass-production, and that it requires no regulating.

In the embodiment described above, the sensor 21 is constructed somewhat differently from the sensor 1. Its coil is formed of two windings 48 and 49 (FIG. 4) which are identical as to shape and characteristics. These windings are disposed coaxially with a separation plate or ring 50 between them. They are covered by a shell 51 and mounted on a plate 52 coated with an adhesive on the surface intended to be affixed to a surface of the vehicle. Also visible in FIG. 4 is the entry of the cable 23 connecting the sensor 21 to the housing. It should be noted that the two windings 48 and 49 are connected in series and wound in reverse directions from one another. The effect of this double winding becomes evident upon consideration of the magnetic field lines 53 shown in dash-lines in FIG. 4 outside a circular magnetic field source 54. When the sensor 21 is in immediate proximity to the source 54, the intensity of the magnetic field in the plane of the middle turn of the winding 48 is distinctly different from the intensity of the magnetic field in the plane of the middle turn of the winding 49 since the latter is closer to the source.

The pulse which will occur in the double winding 48, 49 will have an amplitude dependent upon the difference in the intensity of the field between the location of the winding 48 and that of the winding 49. Suitably amplified, this difference is sufficient, even when it is picked up outside the tachometer housing, to activate the indicator accurately. Moreover, if the sensor 21 is subjected to other magnetic fields emanating from sources farther away, these magnetic fields, which may be variable and may then exert disturbing influences in the event that the sensor comprises only a single coil, will have an intensity which varies extremely little between the locations of the two windings 48 and 49, so that the voltage induced in the winding 48 by a variation of the disturbing field will be nullified by the voltage produced in the winding 49 by the same variation of the field. Thus the arrangement of the sensor with two coaxial windings placed one before the other makes it possible to pick up only the magnetic field emitted by a very close source and to exclude disturbing influences. The sensor may comprise a low-remanence ferromagnetic core. In this case, too, a sufficiently sensitive sensor may be efficiently produced within dimensions of a few cubic centimeters. Thus in a model actually produced, each winding consisted of approximately 2000 turns of a wire about 0.1 mm in diameter, and the outside dimensions of the sensor were 18 mm diameter by approximately 20 mm height.

According to the type of car on which the device is installed, the frequency of the received signal corresponding to a given maximum speed, e.g., 60 km/hr, can, of course, vary since this frequency depends upon the rpm of the magnet 12 and the number of its poles, which can vary according to the design of the speedometer.

Generally speaking, the speed of rotation of the magnet 12 at 60 km/hr (40 mph) is between 500 and 3000 rpm.

The lever 11 in the first embodiment, and the control button of the potentiometer 35 in the second embodiment, enable the user to adjust the corresponding setting element and, consequently, to calibrate the apparatus for a chosen maximum speed. Furthermore, in the second embodiment, the control buttons of the potentiometers 37 and 38 make it possible to set two other maximum speeds selected at will. These adjustments are easily effected and represent a one-time operation carried out when the device is installed. Thereafter, it suffices to push in one of the buttons 24, 25, 26 in order to have the indicator operate when the corresponding maximum speed has been reached.

The apparatus described is simple and takes up little space. However, its main advantage is that it can be attached without any installation work having to be done and without any modification either of the original mechanical parts of the tachometer or of its drive system. In no event does the sensor 1 interfere with the reading of the speed indicated by the speedometer, and it can be mounted outside the magnetic counter by a person without specialized knowledge. Furthermore, the threshold for setting off the alarm can be adjusted very easily.

The apparatus described could also be used on vehicles other than road vehicles, e.g., on locomotives or on aircraft equipped with rotary-magnet speedometers. It could also be used as a control device, e.g., by limiting the carburetor intake when the maximum speed is reached.

What is claimed is:

1. An accessory maximum speed signalling device for a motor vehicle including a first housing, a speedometer having a rotatable magnet in said first housing, said magnet producing a rotating magnetic field having field lines which extend outside said first housing, said speedometer including a speed indicating means and means actuating said indicating means in response to said rotating magnetic field, said accessory signalling device comprising:
   a. a sensor adapted to be located within the field lines which extend outside said first housing but without said first housing, said sensor being sensitive to variations in the magnetic field lines which extend outside said first housing, said sensor including means for emitting an electric signal representative of the variations, and
   b. a second housing, connected to said sensor, said second housing including a speed alarm, a control circuit for receiving the signal emitted by said sensor and actuating said alarm when the signal reaches a predetermined threshold, and setting means for adjusting said threshold.

2. A device according to claim 1, wherein the sensor comprises an induction coil housed in a shell, said coil emitting voltage pulses having a frequency equal to that of the variations of the magnetic field lines.

3. A device according to claim 1, wherein the sensor comprises a semiconductor element housed in a shell, said element emitting voltage pulses having a frequency equal to that of the variations of the magnetic field lines.

4. A device according to claim 1, wherein the setting means comprise a calibration oscillator and a setting member enabling the frequency of said oscillator to be adjusted at will.

5. A device according to claim 1, wherein the setting means include a capacitor for integrating the signal emanating from the sensor and a trigger having an adjustable flipping level.

6. A device according to claim 1, further comprising an electric cable connected to the second housing and connectible to a d.c. power source.

7. A device according to claim 1, wherein the second housing contains a battery supplying the circuit and the alarm.

8. A device according to claim 1, wherein the alarm comprises a buzzer and a lamp.

9. A device according to claim 1, wherein the setting means include several adjustable reference elements, several setting members accessible from outside the second housing and each acting upon one of the reference elements, and several actuating members enabling one or another of the reference elements to be placed in operating position.

10. A device according to claim 2, wherein the sensor comprises two identical, coaxial windings disposed one before the other and wound in reverse directions from one another so as to emit voltage pulses of an amplitude corresponding to the difference in intensity of the magnetic field picked up at the same moment at the locations of the two windings.

* * * * *